United States Patent [19]
Jorgensen et al.

[11] Patent Number: 5,234,119
[45] Date of Patent: Aug. 10, 1993

[54] PLASTIC BOX FOR CEILING FAN SUPPORT

[75] Inventors: Robert W. Jorgensen, South Bend, Ind.; William E. Slater, Niles, Mich.

[73] Assignee: Hubbell Incorporated, Orange, Conn.

[21] Appl. No.: 696,258

[22] Filed: Apr. 30, 1991

Related U.S. Application Data

[63] Continuation of Ser. No. 624,470, Dec. 10, 1990, abandoned, which is a continuation of Ser. No. 545,575, Jun. 29, 1990, abandoned.

[51] Int. Cl.$^5$ ............................................. H02G 3/08
[52] U.S. Cl. ............................................. 272/3.9
[58] Field of Search ................. 220/3.2, 3.3, 3.9; 248/906

[56] References Cited

U.S. PATENT DOCUMENTS

| | | | |
|---|---|---|---|
| 1,748,693 | 2/1930 | Adell | 174/64 |
| 1,800,484 | 4/1931 | Thomas, Jr. | 174/64 |
| 1,966,451 | 7/1934 | Manquais | 174/63 |
| 3,701,448 | 10/1972 | Vadnais | 220/3.9 |
| 3,724,795 | 4/1973 | Callanen | 220/3.9 X |
| 4,135,337 | 1/1979 | Medlin | 220/3.3 X |
| 4,140,293 | 2/1979 | Hansen | 220/3.9 X |
| 4,176,758 | 12/1979 | Glick | 220/3.3 |
| 4,682,452 | 7/1987 | Propp et al. | 220/3.9 X |
| 4,747,506 | 5/1988 | Stuchlik, III | 220/3.9 |
| 4,843,189 | 6/1989 | Jorgensen et al. | 174/53 |
| 4,874,905 | 10/1989 | Schnell et al. | 174/65 R |
| 4,880,128 | 11/1989 | Jorgensen | 220/3.9 |
| 4,909,405 | 3/1990 | Kerr, Jr. | 220/3.9 |
| 5,025,944 | 6/1991 | Rodick | 220/3.9 |

*Primary Examiner*—Steven M. Pollard
*Attorney, Agent, or Firm*—Jerry M. Presson; Alfred N. Goodman; David L. Tarnoff

[57] ABSTRACT

A plastic ceiling box adapted to support a ceiling fan thereon and adapted to be mounted on a structural member, such as a ceiling joist. The ceiling box comprises a body member having a lower wall and a pair of side walls defining a recess for snugly receiving the ceiling joist therein. Box mounting holes for receiving box mounting fasteners are located at opposite sides and ends of the lower wall for attaching the ceiling box to the joist. Openings for receiving fan supporting fasteners are formed in the body member adjacent the box mounting holes. Brackets at opposite ends of the body member aid in attaching the body member to the joist. This overall arrangement provides sufficient support and strength to resist dynamic loads of a ceiling fan even though the ceiling box is formed of plastic.

20 Claims, 4 Drawing Sheets

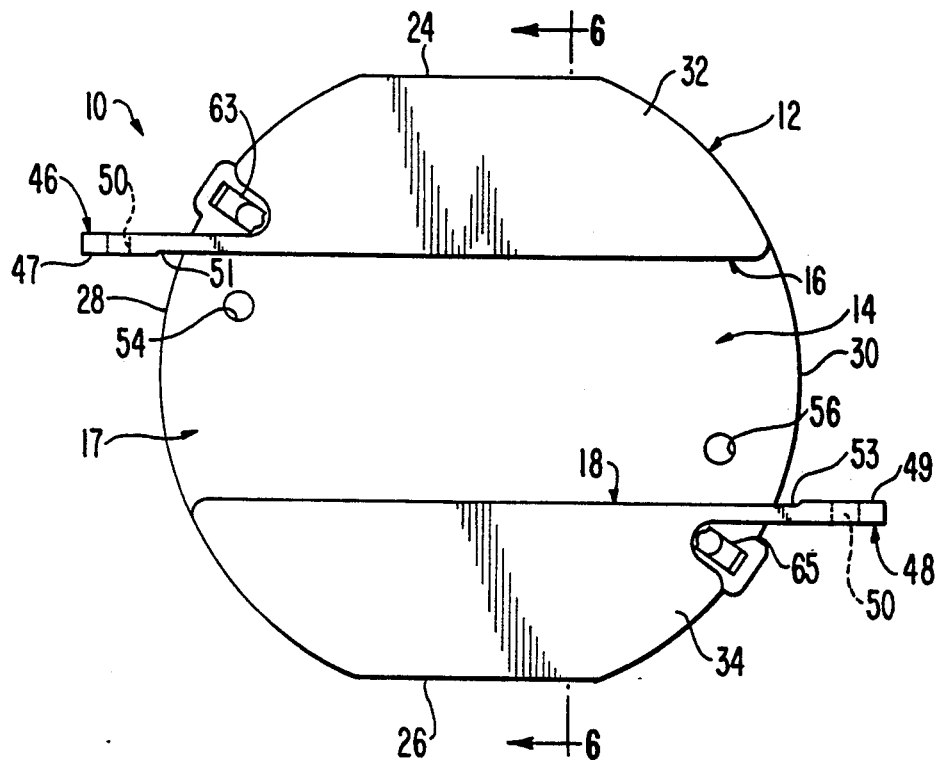
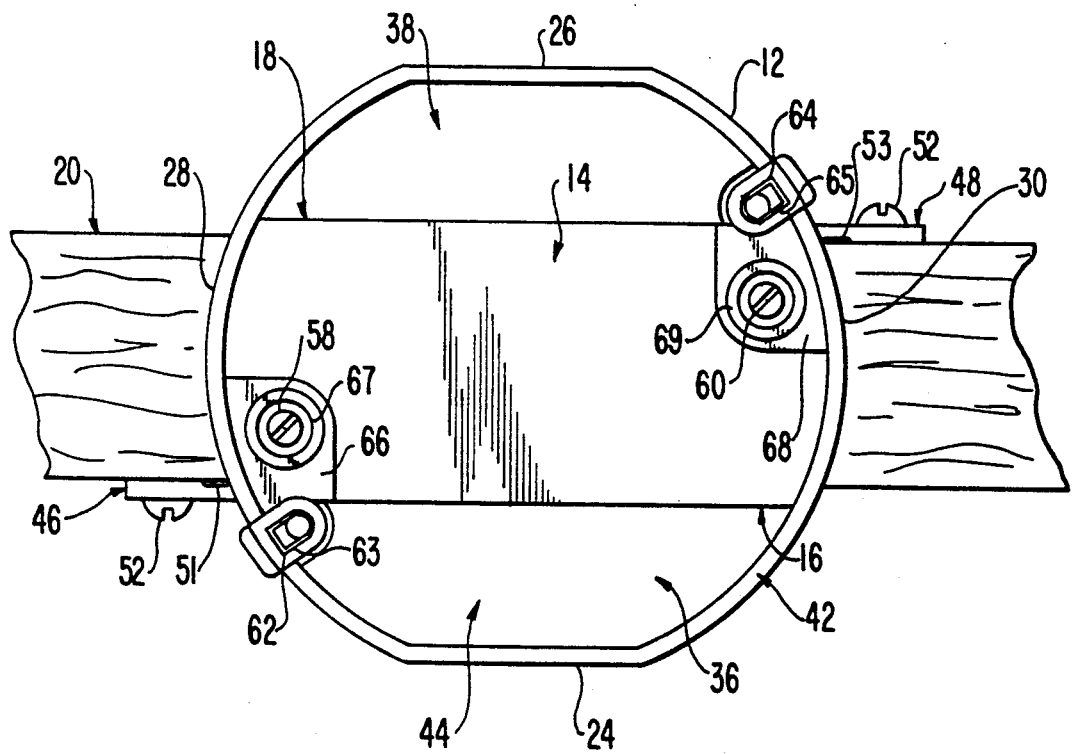

PLASTIC BOX FOR CEILING FAN SUPPORT

This is a continuation of application Ser. No. 07/624,470 filed Dec. 10, 1990, now abandoned which is a continuation of application Ser. No. 07/545,575 filed Jun. 29, 1990, now abandoned.

FIELD OF THE INVENTION

This invention relates to a ceiling box for directly mounting a ceiling fan thereto and in which the ceiling box is the sole support for the ceiling fan. More specifically, the invention relates to a plastic ceiling box specially constructed to straddle a structural member and to withstand the dynamic loads imposed by a ceiling fan, especially the flexing caused by an unbalanced ceiling fan.

BACKGROUND OF THE INVENTION

Ceiling fans have become increasingly popular in today's homes and businesses. Ceiling fans are typically mounted to either a ceiling box or a ceiling pan. Ceiling boxes and ceiling pans are essentially identical, except that ceiling boxes are about 1½ to 2⅛ inches in depth and mounted to the side of a truss, joist or rafter, while ceiling pans are about ½ inch in depth and mounted to the bottom of a truss, joist or rafter. Thus, ceiling boxes are typically used in new work or construction, while ceiling pans are used in old work and new work applications. In old work applications, the ceiling pan eliminates the need to crawl in the attic for mounting it to the joist, which is necessary when using a ceiling box in old work applications.

In the past, ceiling boxes or pans were tested under static loads only. With the increasing popularity of ceiling fans came the concern that the dynamic loads of an unbalanced ceiling fan could cause the ceiling box or pan to flex and break. This concern led to a new 1987 N.E.C. code provision (N.E.C. 370-17C) that required ceiling boxes or pans intended to be used as the sole support of ceiling fans to be tested and listed for that use. Underwriter's Laboratories (U.L.) responded with a new test that ceiling boxes or pans are required to pass.

A plastic ceiling box or pan that withstands the dynamic flexing of an unbalanced ceiling fan and resists torque loads is not known in the prior art. However, because plastic electrical boxes are relatively inexpensive and easy to manufacture, it would be desirable to use plastic ceiling boxes for fan support.

U.S. Pat. No. 3,701,448 to Vadnais discloses a metallic electric junction box having an identification on one side so that the box can be fit over a corrugation or ridge in a roofing panel. By wrapping around the corrugation, the box resists tilting when a heavy fixture is being installed. The Vadnais patent does not disclose a plastic ceiling box which resists the dynamic flexing produced by an unbalanced ceiling fan.

Examples of other electrical outlet boxes known in the art are disclosed in the following U.S. Pat. Nos.: 1,966,451 to Manquais, 1,800,484 to Thomas, and 1,748,693 to Adell.

None of these patents are directed to special problems of flexing and breaking associated with plastic ceiling fan boxes required to withstand torque loads from fan blades or other dynamic motions.

This invention addresses these problems in the art, along with other needs which will become apparent to those skilled in the art once given this disclosure.

SUMMARY OF THE INVENTION

Accordingly, a primary object of the present invention is to provide a ceiling box that resists the fatigue resulting from dynamic loads generated by a ceiling fan.

A further object of the invention is to provide a plastic ceiling box that adequately meets the test standards for plastic ceiling boxes used as the sole support for a ceiling fan.

A further object of the invention is to provide an integrally molded plastic ceiling box that can be used in old work applications, i.e., an existing opening of a ceiling pan or in new construction for installing a ceiling fan.

Another object is to provide a ceiling box that has a large contact area for intimately contacting both sides and bottom of a structural member to resist torque loads placed on the box.

The foregoing objects are basically attained by providing a ceiling box adapted to support a ceiling fan thereon and adapted to be mounted on a structural member, the combination comprising: a body member having a lower wall and first and second opposed side walls defining a recess for receiving a structural member therein; first and second portions formed in the lower wall for receiving first and second box mounting fasteners; the first and second portions being located at opposite sides and ends of the lower wall; and third and fourth portions for receiving first and second fan supporting fasteners, the third and fourth portions being formed in the body member adjacent the first and second portions.

Straddling the structural member or ceiling joist with a large contact area snugly or intimately contacting the ceiling joist allows the ceiling box to withstand the torque loads placed on the box. Having the box mounting portions located at opposite sides and ends of the lower wall and having the fan supporting portions located adjacent to the box mounting portions maximizes support and strength to resist the dynamic loads imposed by a ceiling fan.

Other objects, advantages and salient features of the invention will become apparent from the following detailed description, which, taken in conjunction with the annexed drawings, discloses a preferred embodiment of the invention.

DETAILED DESCRIPTION OF THE DRAWINGS

Referring now to the drawings which form part of this original disclosure:

FIG. 3 is a top plan view of the ceiling box shown in FIG. 1;

FIG. 4 is a bottom plan view of the ceiling box mounted to a joist and showing the mounting holes for mounting a ceiling fan;

DETAILED DESCRIPTION OF THE INVENTION

Figure 1:
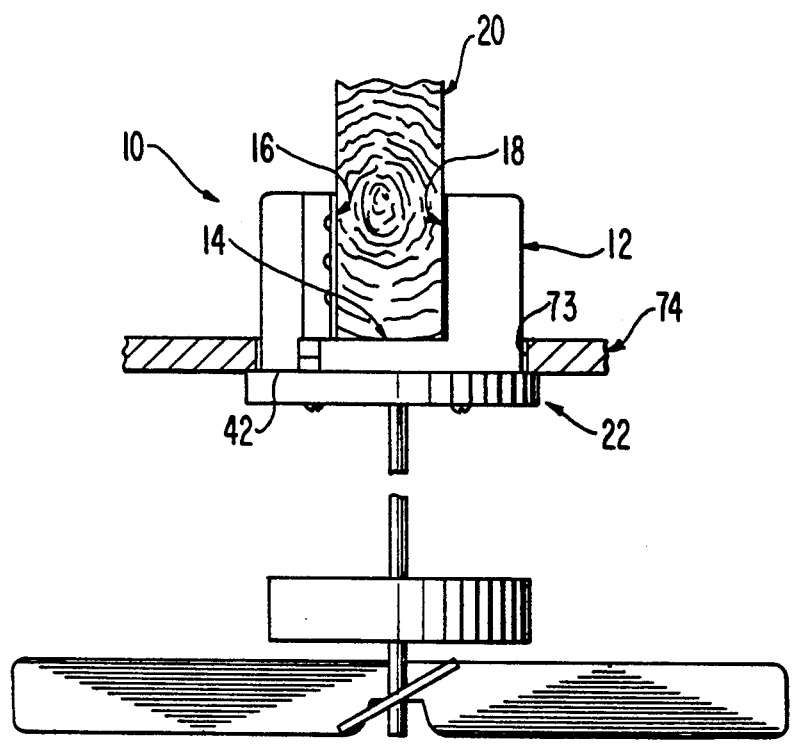
FIG. 1 is an end elevational view of a ceiling box of the present invention mounted to a structural member, such as a ceiling joist, and having a ceiling fan mounted thereto.

Referring to FIGS. 1-7, a ceiling box 10 according to the present invention is illustrated and comprises a body member 12 having a lower wall 14 and first and second side walls 16 and 18 defining a joist receiving recess 17 for snugly receiving a structural member, such as ceiling joist 20 therein. The ceiling box 10 further includes first and second mounting holes 54 and 56 for receiving box mounting fasteners 58 and 60 to couple the ceiling box 10 to the joist 20, and first and second openings 62 and 64 for receiving fan supporting fasteners 70 and 72 to couple a ceiling fan 22 to the ceiling box 10.

Preferably, ceiling box 10 is formed as a one-piece, unitary, integrally molded member from a suitable non-metallic material, such as a thermoplastic or thermoset composition, which is preferably substantially rigid, i.e., not readily flexible. Examples of such thermoplastic materials are polyphenylene oxides and polybutylene terephthalate, and an example of such a thermoset material is phenolic resin. Preferably, ceiling box 10 is formed of Valox, which is a polybutylene terephthalate manufactured by General Electric.

Referring now more specifically to the construction of the ceiling box 10, the body member 12 includes a lower wall 14 that is substantially rectangular and planar. The lower wall 14 is coupled to opposed side walls 16 and 18 which extend perpendicularly upward from the lower wall 14 and are substantially planar and parallel to each other. The lower wall 14 and side walls 16 and 18 define the joist receiving recess 17, which is substantially rectangular in cross section. Preferably, joist receiving recess 17 is sized to snugly receive a ceiling joist 20 therein to maintain intimate contact between the ceiling box 10 and the ceiling joist 20. Accordingly, when the ceiling box 10 is fit around a ceiling joist 20, the ceiling box 10 will not rotate, slide or rock back and forth. It will be readily understood by those skilled in the art that the ceiling box can be constructed specifically to fit a specific size of ceiling joist. This invention can also be adapted to fit ceiling joists that are not rectangular in cross section by shaping the lower wall and side walls accordingly.

The body member 12 further includes an outer wall structure formed by first and second outer walls 24 and 26, first and second end walls 28 and 30 and first and second top walls 32 and 34. The first and second top walls 32 and 34 are planar and extend outwardly from the first and second side walls 16 and 18, respectively. The first and second outer walls 24 and 26 are partially planar and partially curved and extend downwardly from the top walls 32 and 34, respectively, and are each coupled to the two ends of the first and second side walls 16 and 18, respectively.

The first side wall 16, first top wall 32 and first outer wall 24 form an enclosed first lobe or cavity 36 of the body member 12. Second side wall 18, second top wall 34 and second outer wall 26 form an enclosed second lobe or cavity 38 of the body member 12. In combination with the space defined below the lower wall 14, the first and second lobes 36 and 38 define a substantially U-shaped inner cavity in the body member 12.

Each of the side walls 24 and 26 may have one or more break out windows 40 which can be selectively broken off to create openings for passing electrical wires therethrough into the first lobe 36 or second lobe 38 of the body member 12 for connection with the internal wiring of a ceiling fan 22.

The first and second end walls 28 and 30 are curved and extend downward from opposite ends of the lower wall 14 and connect opposite ends of the outer walls 24 and 26. The end walls 28 and 30 and outer walls 24 and 26 form a continuous bottom edge 42 defining an open bottom end 44. Preferably, bottom edge 42 lies in a plane substantially parallel to the lower wall 14 and spaced approximately 0.5 inch from the lower wall 14 for mounting flush with 0.5 inch plasterboard 74.

It will be readily understood by those skilled in the art that while the outer shape of the body member 12 has been described in terms of first and second outer walls, first and second end walls and first and second top walls, the body member 12 surrounding the lower wall 14 and side walls 16 and 18 and the joist receiving recess 17 may have any suitable outer shape, including round or polygonal, for enclosing a space for receiving electrical wires.

The ceiling box 10 may be provided with integrally molded features such as clamping members (not shown) for gripping an electrical cable as described in either U.S. Pat. No. 4,874,905 to Schnell et al or U.S. Pat. No. 4,605,816 to Jorgensen et al, which are both incorporated herein by reference.

Figure 2:
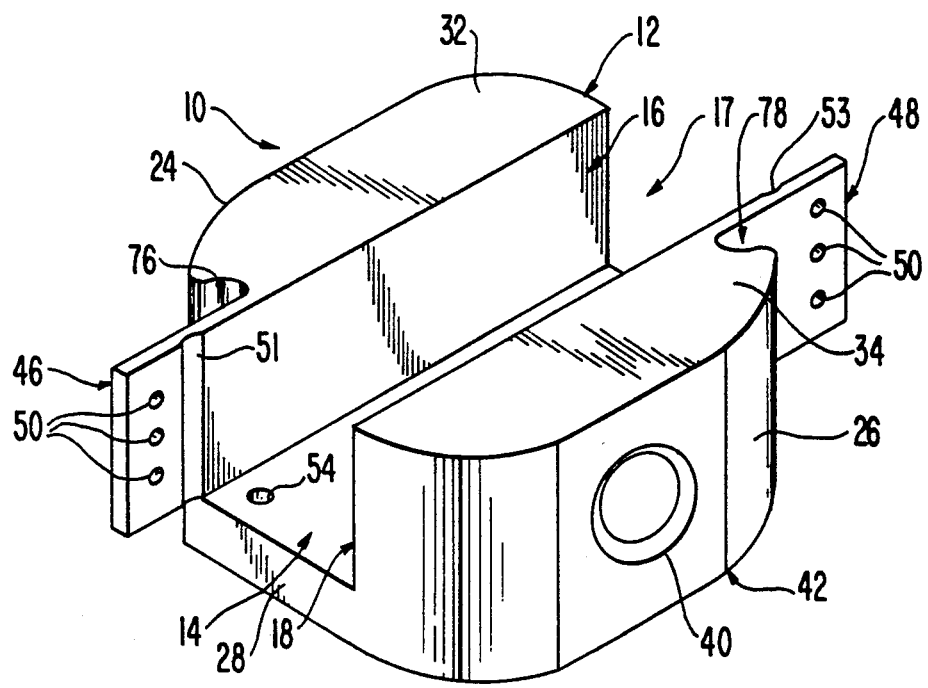
FIG. 2 is a right perspective view of the ceiling box shown in FIG. 1.
Figure 5:
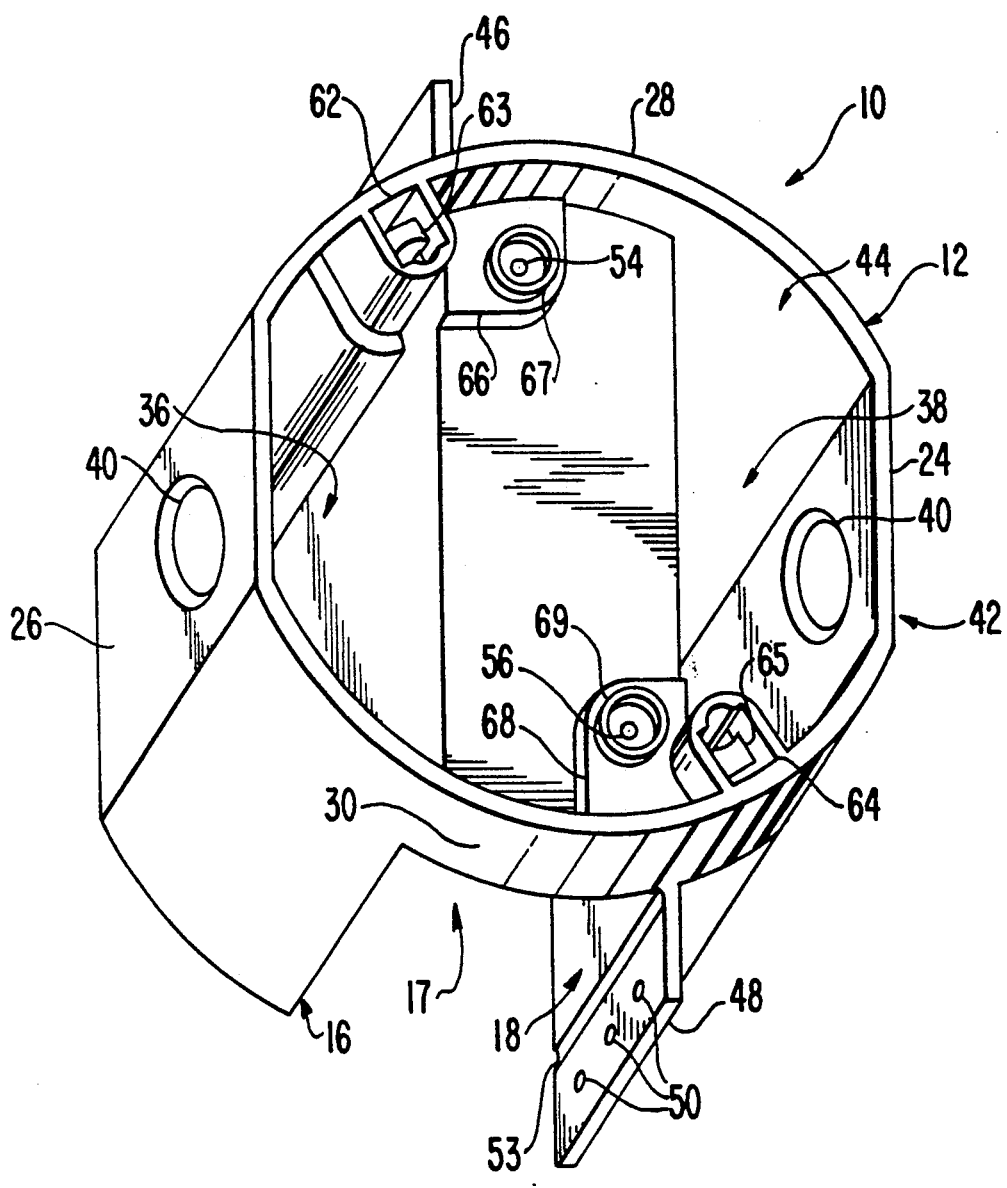
FIG. 5 is a bottom perspective view of the ceiling box shown in FIG. 1.
Figure 6:
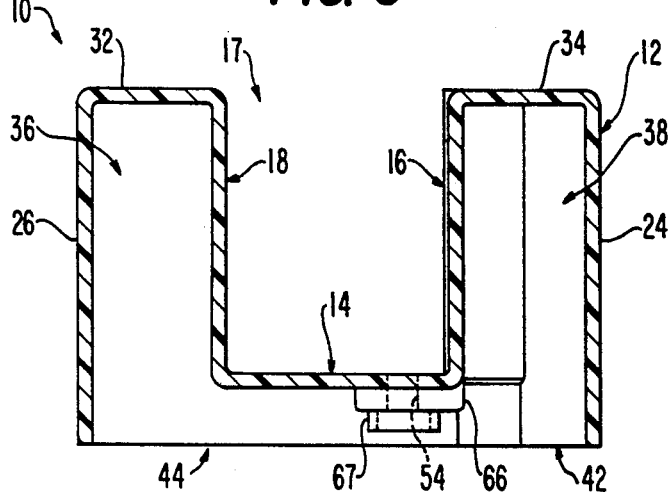
FIG. 6 is an end elevational view in cross section of the ceiling box taken along line 6—6 of FIG. 3.

As seen in FIGS. 2 and 3, the body member 12 also includes first and second brackets 46 and 48 being coupled to and extending outwardly from body member 12 in opposite directions. The first and second brackets are substantially planar and lie in substantially parallel planes. The first bracket 46 extends from the first side wall 16 to form a first substantially planar surface with first side wall 16 for contacting one side of the ceiling joist 20, while the second bracket 48 extends from the second side wall 18 to form a second substantially planar surface with second side wall 18 for contacting the other side of the ceiling joist 20.

As seen in FIG. 3, the inner surfaces 47 and 49 of first and second brackets 46 and 48 are preferably spaced slightly inwardly from the inner surfaces of first and second side walls 16 and 18, respectively, to insure intimate or firm contact with ceiling joist 20. Also, first and second brackets 46 and 48 are each provided with a reduced portion 51 and 53, respectively, adjacent to side walls 16 and 18, respectively. Reduced portions 51 and 53 extend substantially transverse to first and second brackets 46 and 48 to permit the brackets 46 and 48 to flex outwardly upon engaging ceiling joist 20. The brackets 46 and 48 serve as extensions to the side walls 16 and 18 to provide a greater surface area for contacting the ceiling joist 20, thereby imparting greater stability and greater resistance to flexing of the ceiling box 10. The brackets 46 and 48 may also include a series of apertures 50 for receiving bracket screws 52 to allow the brackets 46 and 48 to be attached to a ceiling joist 20.

Figure 7:
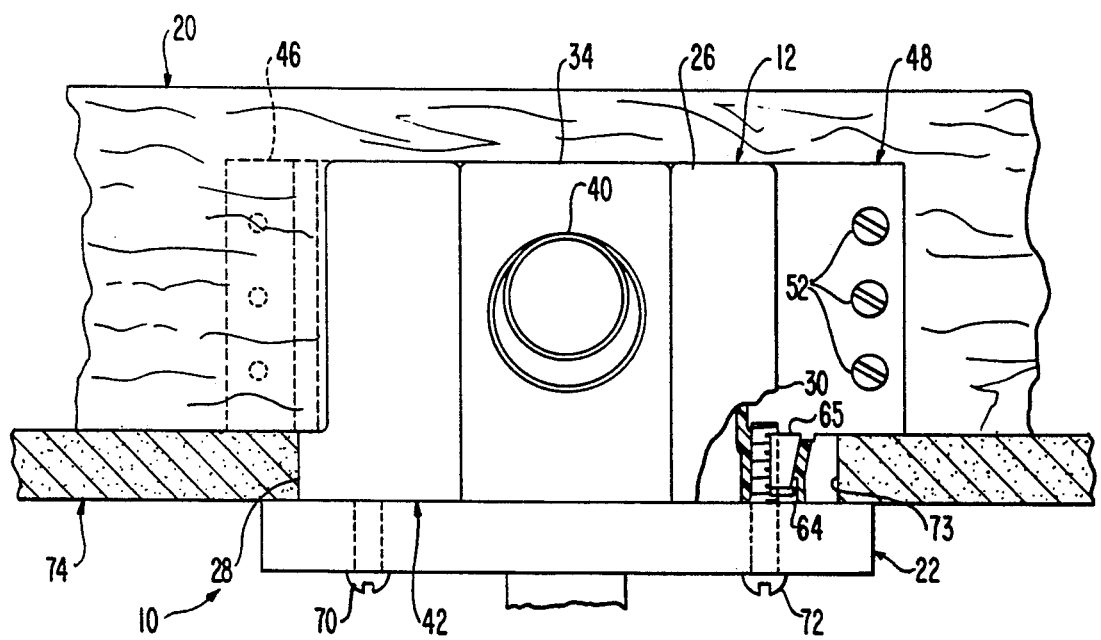
FIG. 7 is a side elevational view of the box showing the box mounted to a joist and a fixture mounted to the box.

The brackets 46 and 48 are preferably on opposite sides and ends of the ceiling box 10 facing opposite sides of the ceiling joist 20 and adjacent opposite corners of the lower wall 14 to provide the maximum resistance to torque loads created by the fan. Preferably, as shown in FIG. 7, the brackets 46 and 48 are spaced upwardly from the bottom edge 42 to allow the bottom end 44 of the ceiling box 10 to extend through opening 73 in plasterboard 74 for mounting the ceiling box 10 flush therewith.

Referring now to FIGS. 3 and 4, the ceiling box 10 of the present invention further includes first and second box mounting holes 54 and 56 for receiving box mounting screws 58 and 60. Preferably, the box mounting holes 54 and 56 are located in the opposite corners at opposite sides and ends of the lower wall 14 and oriented to allow box mounting screws 58 and 60 to be inserted from the underside of the lower wall 14 to screw into a joist 20, thereby mounting the ceiling box 10 to the joist 20. Placing the box mounting holes 58 and 60 at opposite corners of the lower wall 14 allows increased stability for handling torque loads. The lower wall 14 includes reinforced portions 66 and 68 around box mounting holes 54 and 56 for increased strength.

Upstanding cylindrical walls 67 and 69 surround the box mounting holes 54 and 56 for additional strength and to insulate the box mounting screws 58 and 60 from the electrical wiring (not shown) of the fan.

The ceiling box 10 further includes first and second openings 62 and 64 for threadedly engaging fan supporting screws 70 and 72. Preferably, the openings 62 and 64 are formed to receive plastic inserts or cam members 63 and 65 such as described in U.S. Pat. No. 4,843,189 to Jorgensen et al, or described in U.S. Pat. No. 4,315,100 to Haslbeck et al, the disclosures of which are both hereby incorporated by reference. The inserts or cam members 63 and 65 can also be similar to those described in co-pending U.S. application Ser. No. 07/311,334, filed Feb. 15, 1989. Of course, conventional threaded mounting openings may also be used for threadedly engaging fan support screws 70 and 72.

The openings 62 and 64 extend inward from the bottom edge 42 to receive fan supporting screws 70 and 72. The body member 12 includes first and second channels 76 and 78 formed in the outer walls 24 and 26 and which extend upwardly from openings 62 and 64 for inserting cam members 63 and 65 into openings 62 and 64, respectively, and for accommodating longer fan supporting screws. For strength, rigidity and resistance to torque loads, the openings 62 and 64 should be located opposite each other and adjacent the opposite corners of the lower wall 14, adjacent the box mounting screw holes 54 and 56, and adjacent brackets 46 and 48.

As particularly seen in FIGS. 1 and 7, ceiling box 10 is constructed for use in either new construction or old work applications, i.e., an existing opening 73 formed in the ceiling plasterboard and centered below the ceiling joist 20, due to the positioning of first and second box mounting holes 58 and 60 extending through lower wall 14. However, in old work applications, the ceiling box 10 is limited to openings which are centered below a structural member so that ceiling box 10 can straddle the structural member. In either case, it is usually desirable that the ceiling box 10 is mounted on a joist 20 with its bottom edge 42 lying flush with the outer surface of the ceiling plasterboard 74. This is accomplished by the ceiling box 10 of the present invention by spacing lower wall 14 about one-half inch above bottom edge 42 of ceiling box 10 for one-half inch thick ceiling plasterboard.

FIGS. 1 and 7 illustrate a typical installation of the ceiling box 10 mounted on a ceiling joist 20 with the bottom of the ceiling box extending through an opening 73 in ceiling plasterboard 74 so that the bottom edge 42 of the ceiling box 10 is flush with the outer surface of the plasterboard 74.

Installing ceiling box 10 to a ceiling joist 20 for securely supporting a ceiling fan 22 can be accomplished as follows. The body member 12 is placed in a straddling position around a ceiling joist 20 with the lower wall 14, first side wall 16 and second side wall 18 snugly contacting the ceiling joist 20. First and second box mounting screws 58 and 60 are then inserted through first and second box mounting screw holes 54 and 56, and threaded into the ceiling joist 20 for securing the body member 12 to the ceiling joist 20. The ceiling box 10 can be further secured to ceiling joist 20 by first and second brackets 46 and 48, which are fastened to the joist 20 by threading bracket screws 52 into the ceiling joist 20. If not already removed, knock-out hole 40 can be removed as appropriate to prepare for the insertion of electrical wires. Next, the electrical wires of the ceiling fan 22 are coupled to the electrical wires in the ceiling box 10. Fan 22 is now coupled to the ceiling box 10 via fan supporting screws 70 and 72 which are inserted through the fan housing holes, not shown, to threadedly engage the first and second openings 62 and 64. The weight of the ceiling fan 22 is now supported from the ceiling box 10 by fan supporting screws 70 and 72.

When the blades of the ceiling fan 22 rotate during operation of the fan, any twisting or torquing force resulting therefrom is transmitted through the fan supporting screws 70 and 72 to the ceiling box 10. Due to the location of the openings 62 and 64 adjacent the side walls 16 and 18, box mounting screws 58 and 60, and brackets 46 and 48 allows maximum rigidity and strength to resist the bending and flexing forces generated by the fan 22.

Although the invention has been described with respect to a ceiling box and an embodiment for mounting a ceiling fan to a ceiling, the ceiling box 10 can be used to mount other electrical fixtures, such as, e.g., overhead lights. Also, the ceiling box 10 can be used to mount such fixtures to the walls or other surfaces of a building that contain a support member, i.e., stud, that can be straddled by the box.

While only one embodiment has been chosen to illustrate the invention, it will be understood by those skilled in the art that various changes and modifications can be made herein without departing from the scope of the invention as defined in the appended claims.

What is claimed is:

1. A ceiling box adapted to support a ceiling fan thereon and adapted to be mounted on a structural member, the combination comprising:

a body member having a lower wall and first and second opposed side walls defining a recess for receiving the structural member therein;

first means, formed in said lower wall, for receiving a first box mounting fastener therein;

second means, formed in said lower wall, for receiving a second box mounting fastener therein, said first and second means being located at opposite sides and ends of said lower wall;

third means, formed in said body member adjacent said first means, for receiving a first fan supporting fastener therein; and fourth means, formed in said body member adjacent said second means, for receiving a second fan supporting fastener therein, said ceiling box being integrally formed of substantially rigid plastic.

2. The ceiling box according to claim 1, wherein said third means includes a first opening located adjacent said first means to receive a first fan supporting fastener therein and said fourth means includes a second opening located adjacent said second means to receive a second fan supporting fastener therein.

3. The ceiling box according to claim 1, wherein said lower wall and first and second side walls are substantially planar.

4. The ceiling box according to claim 3, wherein said lower wall is substantially perpendicular to said first and second side walls and said recess is substantially rectangular in cross-section.

5. The ceiling box according to claim 3, wherein said recess is sized to snugly receive the structural member and to allow intimate contact of said lower wall and said first and second side walls with the structural member to prevent rocking and rotation movements of said body member when a structural member is received in said recess.

6. The ceiling box according to claim 3, wherein said first and second means include first and second screw holes, respectively, in said lower wall for receiving the first and second box mounting fasteners therethrough into said recess.

7. The ceiling box according to claim 3, wherein said third and fourth means include first and second openings, respectively, for receiving first and second fan supporting fasteners therein.

8. The ceiling box according to claim 3, wherein said body member further comprises
first and second top walls coupled to said first and second side walls, respectively;
first and second outer walls coupled to said first and second side walls and first and second top walls; and
first and second end walls coupled to said first and second outer walls and said lower wall;
said first and second outer walls and said first and second end walls having a continuous bottom edge defining an open bottom end; and
said lower wall, first and second top walls, first and second side walls, first and second end walls and first and second outer walls define a substantially U-shaped inner cavity in said body member.

9. The ceiling box according to claim 8, wherein said body member includes at least one break-out window adapted to receive electrical wires after a portion is broken away.

10. The ceiling box according to claim 9, wherein said at least one break-out window is located in at least one of said first and second outer walls.

11. The ceiling box according to claim 8, wherein said bottom edge lies in a plane substantially parallel to said lower wall, and said lower wall is spaced approximately 0.5 inch from said bottom edge.

12. The ceiling box according to claim 1, wherein said body member further comprises:
first and second brackets;
said first bracket being coupled to said body member adjacent said first means and said third means and to form a first substantially planar surface with said first side wall for contacting the structural member; and said second bracket being coupled to said body member adjacent said second means and said fourth means and to form a second substantially planar surface with said second side wall for contacting the structural member.

13. The ceiling box according to claim 12, and further comprising
fifth means formed in said first bracket for receiving at least one first bracket fastener and sixth means formed in said second bracket for receiving at least one second bracket fastener.

14. A plastic ceiling box adapted to support a ceiling fan thereon and adapted to be mounted on a ceiling joist, the combination comprising:
a substantially planar lower wall having means for mounting said ceiling box to the ceiling joist;
first and second substantially planar opposed side walls coupled to and substantially perpendicular to said lower wall for defining a joist receiving recess sized to snugly receive a ceiling joist therein;
an outer wall structure coupled to said first and second side walls and said lower wall for defining a substantially U-shaped inner cavity with a continuous bottom edge defining an open bottom;
a first bracket being coupled to said outer wall structure to form a first substantially planar surface with said first side wall for contacting one side of the ceiling joist;
a second bracket being coupled to said outer wall structure to form a second substantially planar surface with said second side wall for contacting the other side of the ceiling joist; and
fastening means, coupled to said outer wall structure at said bottom edge, for coupling the ceiling fan thereto.

15. The plastic ceiling box according to claim 14, wherein
said ceiling box is formed as a one-piece, unitary, integrally molded member.

16. The plastic ceiling box according to claim 14, wherein
said means for mounting includes a pair of mounting holes extending through said lower wall for receiving a mounting fastener in each of said mounting holes.

17. The plastic ceiling box according to claim 16, wherein
said lower wall is substantially rectangular with one of said mounting holes located adjacent a first corner of said lower wall, and the other of said mounting holes located in a second corner of said lower wall opposite to said first corner.

18. The plastic ceiling box according to claim 17, wherein
said fastening means includes a pair of openings for threadedly receiving a pair of fan supporting fasteners therein.

19. The plastic ceiling box according to claim 18, wherein
one of said openings is located adjacent one of said mounting holes, and the other of said openings is located adjacent the other of said mounting holes.

20. The plastic ceiling box according to claim 18, wherein
said fastening means is directly coupled to said outer wall structure.

* * * * *